(12) United States Patent
Takegawa et al.

(10) Patent No.: US 10,693,390 B2
(45) Date of Patent: Jun. 23, 2020

(54) POWER CONVERSION DEVICE FOR CONTROLLING DISCHARGE OF A CAPACITOR

(71) Applicants: Mitsubishi Electric Corporation, Tokyo (JP); Honda Motor Co., Ltd., Tokyo (JP)

(72) Inventors: Kazuki Takegawa, Tokyo (JP); Satoshi Ishibashi, Tokyo (JP); Kazuhiko Otsuka, Tokyo (JP); Masaya Takahashi, Saitama (JP)

(73) Assignees: MITSUBISHI ELECTRIC CORPORATION, Tokyo (JP); HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 16/196,049

(22) Filed: Nov. 20, 2018

(65) Prior Publication Data
US 2019/0173390 A1  Jun. 6, 2019

(30) Foreign Application Priority Data
Dec. 5, 2017 (JP) .................. 2017-233075

(51) Int. Cl.
*H02M 1/32* (2007.01)
*H02P 1/04* (2006.01)
(Continued)

(52) U.S. Cl.
CPC ............... *H02M 7/48* (2013.01); *G01K 1/08* (2013.01); *H02M 1/32* (2013.01); *H02P 3/18* (2013.01);
(Continued)

(58) Field of Classification Search
CPC ..... H02M 2001/007; H02M 2001/322; H02M 2001/327; H02M 7/48; H02P 29/68;
(Continued)

(56) References Cited

U.S. PATENT DOCUMENTS

2006/0175995 A1* 8/2006 Shinmura .......... B60W 20/50
318/139
2007/0200529 A1* 8/2007 Kaneko ............ B60L 50/16
318/801
(Continued)

FOREIGN PATENT DOCUMENTS

JP   2016-111754 A   6/2016
JP   2017-159773 A   9/2017

OTHER PUBLICATIONS

Japanese Office Action for Patent Application No. 2017-233075 dated Sep. 25, 2018.

*Primary Examiner* — Nguyen Tran
*Assistant Examiner* — David A. Singh
(74) *Attorney, Agent, or Firm* — Sughrue Mion, PLLC; Richard C. Turner

(57) ABSTRACT

In inverter control for supplying power to a motor, a power conversion device includes a temperature sensor for detecting a temperature of the inverter, a voltage sensor for detecting a voltage between terminals of a capacitor that smooths the voltage between terminals between the power source and the inverter, an inverter controller for controlling the inverter, a rotation speed sensor for detecting a rotation speed of the motor, an electric current sensor for detecting electric current supplied to the motor and a discharge determination instruction controller for giving an instruction for discharging electric charges accumulated in the capacitor, in which, control of reducing the rotation speed of the motor and discharge control of the capacitor are performed
(Continued)

in accordance with the temperature of the inverter, the rotation speed of the motor and the electric current supplied to the motor.

9 Claims, 7 Drawing Sheets

(51) Int. Cl.
| | |
|---|---|
| H02P 3/18 | (2006.01) |
| H02P 29/68 | (2016.01) |
| G01P 5/10 | (2006.01) |
| H02M 7/48 | (2007.01) |
| H02P 25/24 | (2006.01) |
| H02P 25/04 | (2006.01) |
| G01K 1/08 | (2006.01) |
| H02P 27/06 | (2006.01) |
| H02M 7/5387 | (2007.01) |
| H02M 3/158 | (2006.01) |
| H02P 3/16 | (2006.01) |
| H02P 6/14 | (2016.01) |
| G01K 17/00 | (2006.01) |

(52) U.S. Cl.
CPC .............. *H02P 25/04* (2013.01); *H02P 25/24* (2013.01); *H02P 27/06* (2013.01); *G01K 17/00* (2013.01); *G01P 5/10* (2013.01); *H02M 3/158* (2013.01); *H02M 7/53871* (2013.01); *H02M 2001/322* (2013.01); *H02M 2001/327* (2013.01); *H02P 1/04* (2013.01); *H02P 3/16* (2013.01); *H02P 6/14* (2013.01); *H02P 29/68* (2016.02); *H02P 2201/09* (2013.01)

(58) Field of Classification Search
CPC ...... H02P 1/00; H02P 1/04; H02P 1/46; H02P 3/00; H02P 3/16; H02P 3/18; H02P 6/00; H02P 6/14; H02P 21/00; H02P 23/00; H02P 27/00; H02P 27/04; H02P 27/06; G01K 7/346; G01K 17/00; G01P 5/10
USPC ......... 318/400.01, 400.14, 400.15, 430, 471, 318/472, 700, 701, 721, 779, 795, 796, 318/799, 800, 801, 805
See application file for complete search history.

(56) References Cited

U.S. PATENT DOCUMENTS

| | | | |
|---|---|---|---|
| 2012/0309588 A1* | 12/2012 | Ashida .................. | B60L 3/0007 477/7 |
| 2013/0033914 A1* | 2/2013 | Yahata .................... | H02M 7/48 363/132 |
| 2013/0049663 A1* | 2/2013 | Amano .................. | B60L 3/0007 318/453 |
| 2013/0049665 A1* | 2/2013 | Oyobe ...................... | H02P 3/22 318/489 |
| 2014/0239870 A1* | 8/2014 | Nawa ................ | H02M 7/53871 318/503 |
| 2014/0330465 A1* | 11/2014 | Matsudaira ........... | B60W 20/00 701/22 |
| 2015/0326124 A1* | 11/2015 | Ono ....................... | H02M 3/158 323/271 |
| 2016/0089990 A1* | 3/2016 | Nishimura .......... | B60L 11/1803 701/22 |
| 2016/0248347 A1* | 8/2016 | Shinohara ................. | H02P 3/12 |
| 2016/0294309 A1* | 10/2016 | Sakai ...................... | B60L 15/12 |
| 2017/0259668 A1* | 9/2017 | Nomura ................ | B60K 28/14 |
| 2018/0178656 A1* | 6/2018 | Takegawa ............ | B60L 3/0007 |

* cited by examiner

POWER CONVERSION DEVICE FOR CONTROLLING DISCHARGE OF A CAPACITOR

BACKGROUND OF THE INVENTION

Field of the Invention

The present invention relates to a power conversion device, and particularly relates to a power conversion device including a device that controls discharge of electric charges accumulated in a capacitor.

Description of Related Art

A power conversion device includes a boost converter that boosts a DC voltage supplied from a chargeable/dischargeable DC power source, a primary smoothing capacitor that smooths a voltage between the DC power supply and the boost converter, an inverter that converts a high-pressure DC voltage outputted from the boost converter into an AC voltage and a secondary smoothing capacitor that smooths a voltage between the boost converter and the inverter, having a function of supplying the AC voltage outputted from the inverter to a motor.

In a vehicle provided with the power conversion device, electric charges accumulated in the secondary smoothing capacitor are discharged immediately when the vehicle collides or an engine is stopped for preventing electrical shock. The discharge is performed by three-phase ON control of the inverter so that all switching devices in an upper arm and all switching devices in a lower arm in plural switching devices of the inverter are in an ON state. However, a voltage of the secondary smoothing capacitor is increased due to an induced voltage from the motor when the motor is rotating at the time of the control, therefore, a discharging time may be elongated and a temperature of the inverter may be increased to a limit temperature of driving.

Accordingly, in the description of Patent Literature 1, three-phase ON control is stopped when the temperature of an inverter reaches a threshold value or more obtained by subtracting an estimated increased temperature in the discharge control from the limit temperature of driving during execution of the three-phase ON control for suppressing voltage increase due to the induced voltage from the motor.

However, in the technique proposed in Patent Literature 1, there is a problem that an action for a case where it is difficult to detect the rotation speed of the motor is not considered and thus it is difficult to execute the discharge control when the rotation speed is not detected. There is also a problem that gradual reduction of temperature and elongated execution time of discharge control occuring after the three-phase ON control is stopped are not considered, furthermore, there is a problem that determination for stopping the three-phase ON control is made in an early stage as a threshold for determining the stop of the three-phase ON control is set to a lower value than the limit temperature of driving.

[Patent Literature 1] JP-A-2016-111754

SUMMARY OF THE INVENTION

In view of the above problems, an object of the present invention is to provide a power conversion device capable of continuing operation without stopping operation even when a sensor is not normal under the control of reducing the rotation speed of the motor and during rapid discharge after the vehicle collision or after the engine stop, and capable of discharging high-pressure electric charges accumulated in the secondary smoothing capacitor without causing a failure due to temperature increase in inverter devices.

A power conversion device connected between a power source and a motor according to the present invention includes an inverter for converting a voltage outputted from the power source into an AC voltage, a temperature sensor for detecting a temperature of the inverter, a capacitor that smooths a voltage between terminals between the power source and the inverter, a voltage sensor for detecting the voltage between terminals of the capacitor, an inverter controller for controlling the inverter, a rotation speed sensor for detecting a rotation speed of the motor, an electric current sensor for detecting electric current supplied to the motor, and a discharge determination instruction section for giving an instruction for discharging electric charges accumulated in the capacitor, in which, after control of reducing the rotation speed of the motor is performed in accordance with the temperature of the inverter, the rotation speed of the motor and the electric current supplied to the motor, discharge control of the capacitor is performed.

In the power conversion device according to the present invention, the control of reducing the rotation speed of the motor and the discharge operation of electric charges accumulated in the capacitor can be completed while avoiding a failure of the inverter due to the increase in temperature.

The foregoing and other object, features, aspects, and advantages of the present invention will become more apparent from the following detailed description of the present invention when taken in conjunction with the accompanying drawings.

DESCRIPTION OF EMBODIMENTS

Hereinafter, a discharge device of a power conversion device according to an embodiment will be explained with reference to the drawings. A case in which the power conversion device is mounted on a car will be explained in the embodiment, however, the power conversion device may be mounted on vehicles other than the car.

Embodiment

Figure 1:
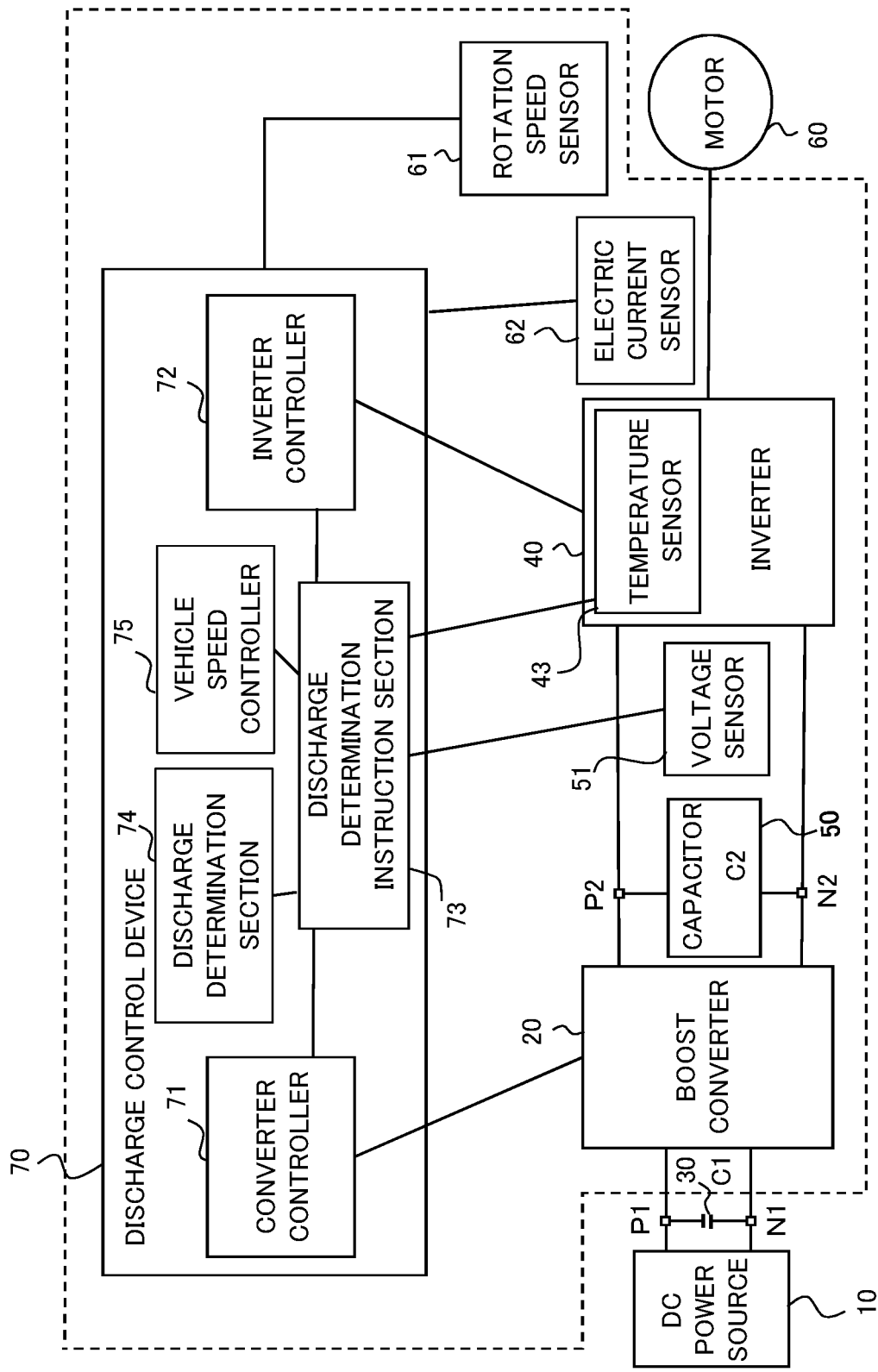
FIG. 1 is a configuration diagram showing a power conversion device according to an embodiment.

FIG. 1 is a configuration diagram showing a power conversion device according to the embodiment. In FIG. 1, the power conversion device has a configuration of a range surrounded by a dotted line, which is provided between a DC power source 10 and a three-phase AC motor 60 and includes a boost converter 20, a primary smoothing capacitor 30, an inverter 40, a secondary smoothing capacitor 50, a voltage sensor 51, a rotation speed sensor 61 of a motor, an electric current sensor 62 and a discharge control device 70.

The DC power source 10 is capable of charging and discharging, which exchanges power with the three-phase AC motor 60 through the inverter 40. The boost converter 20 is provided between the DC power source 10 and the inverter 40, and a DC voltage supplied from the DC power source 10 is boosted by DC/DC conversion. (When an output voltage of the DC power source is sufficient, the boost converter 20 may be omitted). The primary smoothing capacitor 30 is connected between the DC power source 10 and the boost converter 20, which smooths the voltage between the DC power source 10 and the boost converter 20.

The inverter 40 converts a high-pressure DC voltage outputted from the boost converter 20 into an AC voltage by DC/AC conversion. The secondary smoothing capacitor 50 is connected between the boost converter 20 and the inverter 40, which smooths the voltage between the boost converter 20 and the inverter 40. The voltage sensor 51 measures a voltage between a high-pressure side node and a low-pressure side node of the secondary smoothing capacitor 50.

The AC voltage outputted from the inverter 40 is applied to the three-phase AC motor 60, thereby generating power for controlling a driving force and a braking force of a vehicle or for controlling the vehicle. The rotation speed sensor 61 of the motor is a means for detecting a rotation speed, measuring the rotation speed of the three-phase AC motor 60. The electric current sensor 62 is a means for detecting electric current, which measures a current value flowing in the three-phase AC motor 60.

The discharge control device 70 includes a converter controller 71, an inverter controller 72 and a discharge determination instruction section 73. The discharge determination instruction section 73 instructs the inverter controller 72 as an inverter controller to discharge electric charges accumulated in the secondary smoothing capacitor 50 in a case where a collision of the vehicle is detected by a discharge determination section 74 and a case where an engine is stopped by a vehicle speed controller 75. At the same time, the discharge determination instruction section 73 instructs the converter controller 71 to discharge electric charges accumulated in the primary smoothing capacitor 30 and an energy transfer capacitor 23 (shown in FIG. 2) in the boost converter 20. The detection of the collision of the vehicle by the discharge determination section 74 is indirectly performed based on various condition variations of the vehicle generated at the time of the collision.

The boost converter 20 includes an arm in which four power semiconductor devices are connected in series.

Figure 2:
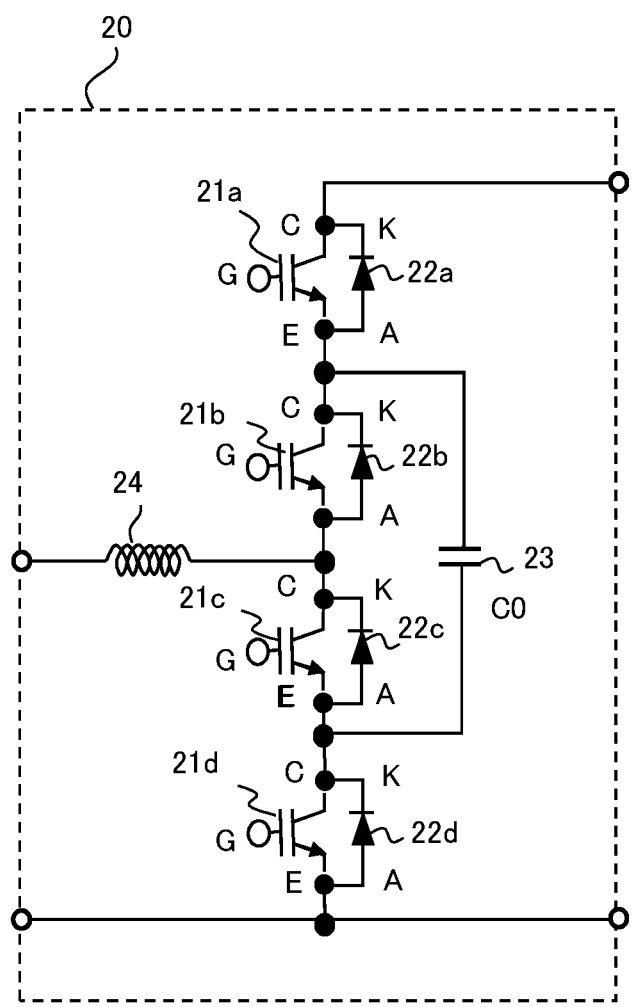
FIG. 2 is a circuit diagram showing a configuration of a boost converter of the power conversion device.
Figure 3:
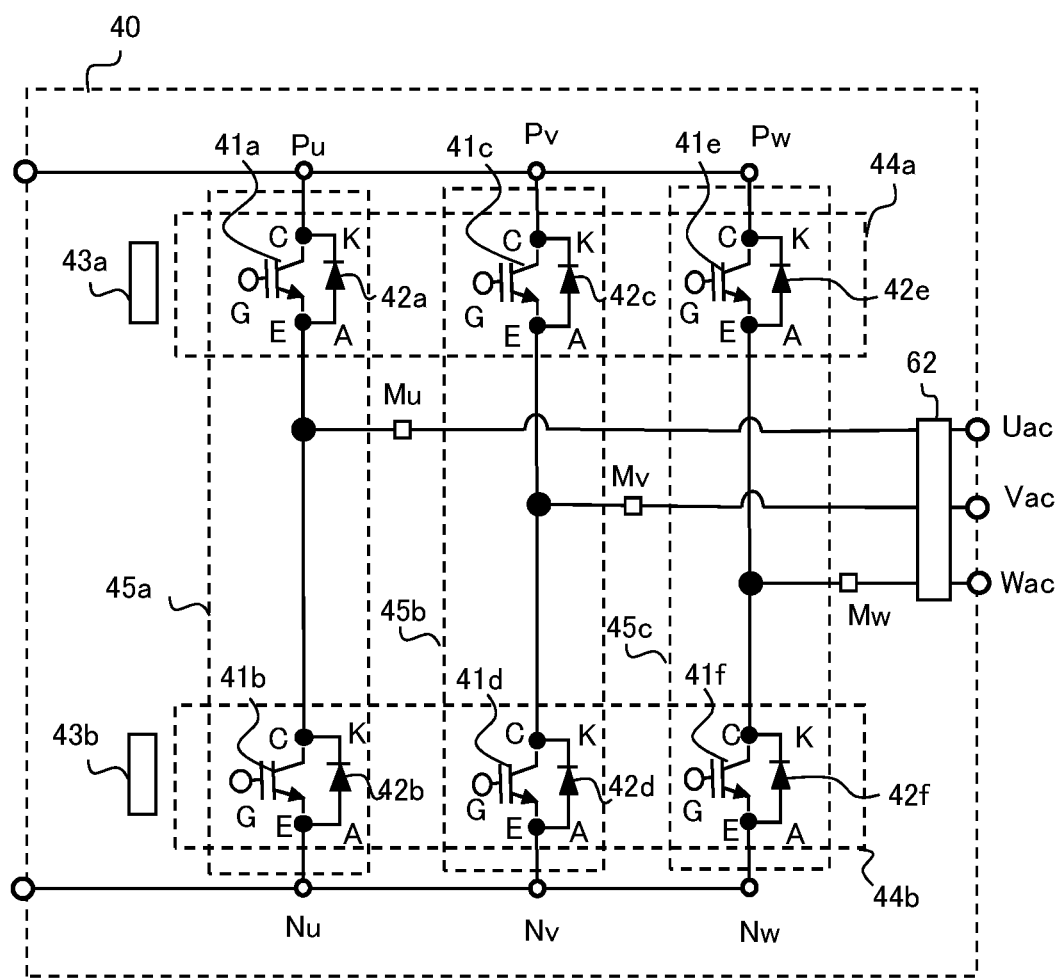
FIG. 3 is a circuit diagram showing a configuration of an inverter of the power conversion device.

The converter controller 71 controls switching operations of semiconductor switching devices 21*a*, 21*b*, 21*c* and 21*d* as components of power semiconductor devices included in the boost converter 20 the configuration of which is shown in FIG. 2 and performs DC/DC conversion in the boost converter 20. The inverter controller 72 controls switching operations of semiconductor switching devices 41*a*, 41*b*, 41*c*, 41*d*, 41*e* and 41*f* in an upper-arm side power semiconductor device 44*a* and a lower-arm side power semiconductor device 44*b* as switching arms included in the inverter 40 the configuration of which is shown in FIG. 3 and performs DC/AC conversion in the inverter 40.

In the boost converter 20 and the inverter 40, the power semiconductor device is configured so that a semiconductor switching device and a semiconductor rectifier are connected in anti-parallel with each other as one unit. A serial connected body of the power semiconductor devices is called an arm.

In an arm of the boost converter 20, an IGBT made of Si as a material is used for the semiconductor switching devices 21*a*, 21*b*, 21*c* and 21*d*, and a PiN diode also made of Si as a material is used for semiconductor rectifiers 22*a*, 22*b*, 22*c* and 22*d* as shown in FIG. 2.

A cathode electrode K of the semiconductor rectifier 22*a* is connected to a collector electrode C of the semiconductor switching device 21*a*, an anode electrode A of the semiconductor rectifier 22*a* is connected to an emitter electrode E of the semiconductor switching device 21*a*, which are connected in anti-parallel with each other as one unit of the power semiconductor device. Here, an emitter electrode E of the semiconductor switching device 21*d* is connected to a low-voltage side node N1 of the primary smoothing capacitor 30 as well as connected to a low-voltage side node N2 of the secondary smoothing capacitor 50. The low-voltage side node N2 is connected to nodes Nu, Nv and Nw of the lower-arm side power semiconductor device 44*b* of the inverter 40.

Accordingly, a low-voltage side output terminal of the DC power source 10, the low-voltage side nodes N1, N2 and the nodes Nu, Nv and Nw of the lower-arm side power semiconductor device 44*b* of the inverter 40 have the same potential (typically, a potential Vn).

A collector electrode C of the semiconductor switching device 21*d* is connected to an emitter electrode E of the semiconductor switching device 21*c* and a low-voltage side node of the energy transfer capacitor 23. A collector electrode C of the semiconductor switching device 21*c* is connected to an emitter electrode E of the semiconductor switching device 21*b* and an end of a coil of a reactor 24. A collector electrode C of the semiconductor switching device 21*b* is connected to the emitter electrode E of the semiconductor switching device 21*a* and a high-voltage side node of the energy transfer capacitor 23.

On the other hand, the collector electrode C of the semiconductor switching device 21*a* is connected to a high-voltage side node P2 of the secondary smoothing capacitor 50. The high-voltage side node P2 is connected to nodes Pu, Pv and Pw of the upper-arm side power semiconductor device 44*a* of the inverter 40. Therefore, the high-voltage side node P2 and the nodes Pu, Pv and Pw of the upper-arm side power semiconductor device 44*a* of the inverter 40*a* have the same potential (typically, a potential Vp).

The inverter 40 is configured as shown in FIG. 3. The number of arms provided in the inverter 40 corresponds to the number of phases of the three-phase AC motor 60 to be driven, and U-phase, V-phase and W-phase three switching arms 45*a*, 45*b* and 45*c* are provided in this case.

In the U-phase switching arm 45*a* of the inverter 40, for example, the insulated gate bipolar transistor (IGBT) made of Si as a material is used for the semiconductor switching devices 41*a* and 41*b*, and the PiN diode also made of Si as a material is used for the semiconductor rectifiers 42*a* and 42*b*.

A cathode electrode K of the semiconductor rectifier 42*a* is connected to a collector electrode C of the semiconductor switching device 41*a*, and an anode electrode A of the semiconductor rectifier 42*a* is connected to an emitter electrode E of the semiconductor switching device 41*a*, which are connected in anti-parallel with each other as one unit of the power semiconductor device. Similarly, a cathode electrode K of the semiconductor rectifier 42*b* is connected to a collector electrode C of the semiconductor switching device 41b, and an anode electrode A of the semiconductor rectifier 42b is connected to an emitter electrode E of the semiconductor switching device 41b. The U-phase switching arm 45a of the inverter 40 is configured so that the power semiconductor device including the semiconductor switching device 41a and the semiconductor rectifier 42a is connected to the power semiconductor device including the semiconductor switching device 41b and the semiconductor rectifier 42b in series.

The V-phase switching arm 45b and the W-phase switching arm 45c of the inverter 40 are also configured so that the power semiconductor device including the semiconductor switching device 41c and the semiconductor rectifier 42c is connected to the power semiconductor device including the semiconductor switching device 41d and the semiconductor rectifier 42d in series, as well as so that the power semiconductor device including the semiconductor switching device 41e and the semiconductor rectifier 42e is connected to the power semiconductor device including the semiconductor switching device 41f and the semiconductor rectifier 42f in series. The inverter controller 72 controls switching operations of semiconductor switching devices inside the upper-arm side power semiconductor device 44a and the lower-arm side power semiconductor device 44b in the switching arms 45a, 45b and 45c included in the inverter 40 and adjusts potentials of connection nodes Uac, Vac and Wac with respect to the three-phase AC motor 60, thereby controlling a current amount flowing in the three-phase AC motor 60.

As a result, the three-phase AC motor 60 generates power for controlling the driving force and the braking force of the vehicle and controlling of the vehicle. The inverter controller 72 also acquires rotation information of the three-phase AC motor 60 from a rotation speed sensor 61.

Next, the operation of the power conversion device at the time of a collision of the vehicle or at the time of an engine stop will be explained. First, the discharge controller 70 stops the vehicle safely when a collision of the vehicle is detected by the discharge determination section 74 or in a case where use of the vehicle is ended and the engine is stopped by the vehicle speed controller 75.

Subsequently, power supply from the DC power source 10 is stopped, and the discharge determination instruction section 73 instructs the inverter controller 72 to execute a discharge operation. The inverter controller 72 first controls all the semiconductor switching devices inside the inverter 40 to be in an off (open) state in accordance with the instruction for executing the discharge operation by the discharge determination instruction section 73 and acquires rotation information from the rotation speed sensor 61 of the motor.

Here, in a case where rotation information from the rotation speed sensor 61 of the motor indicates that the three-phase AC motor 60 is still rotating even though the above control has been performed, there is a possibility that the three-phase AC motor 60 continues rotating due to external factors such as a case where driving wheels (not shown) of the vehicle are spinning in a state of being floated from a road surface or a case where the vehicle is not completely stopped after the collision.

In such cases, a counter electromotive force is generated in the three-phase AC motor 60 and electric current flows in the power semiconductor devices inside the inverter 40, which may charge the secondary smoothing capacitor 50 which should be originally discharged. Accordingly, in a case where the three-phase AC motor 60 rotates and the counter electromotive force is generated although the vehicle collides and relief activities due to some factors and accident handling of the vehicle should be performed, the rotation speed of the three-phase AC motor 60 is immediately reduced and discharge control is performed so as not to charge the secondary smoothing capacitor 50. The discharge control is performed also when the vehicle is normally stopped for improving safety performance.

In the embodiment, temperature sensors 43a and 43b are provided for acquiring temperatures of the upper-arm side power semiconductor device 44a and the lower-arm side power semiconductor device 44b of the inverter 40 as shown in FIG. 3.

Figure 4:
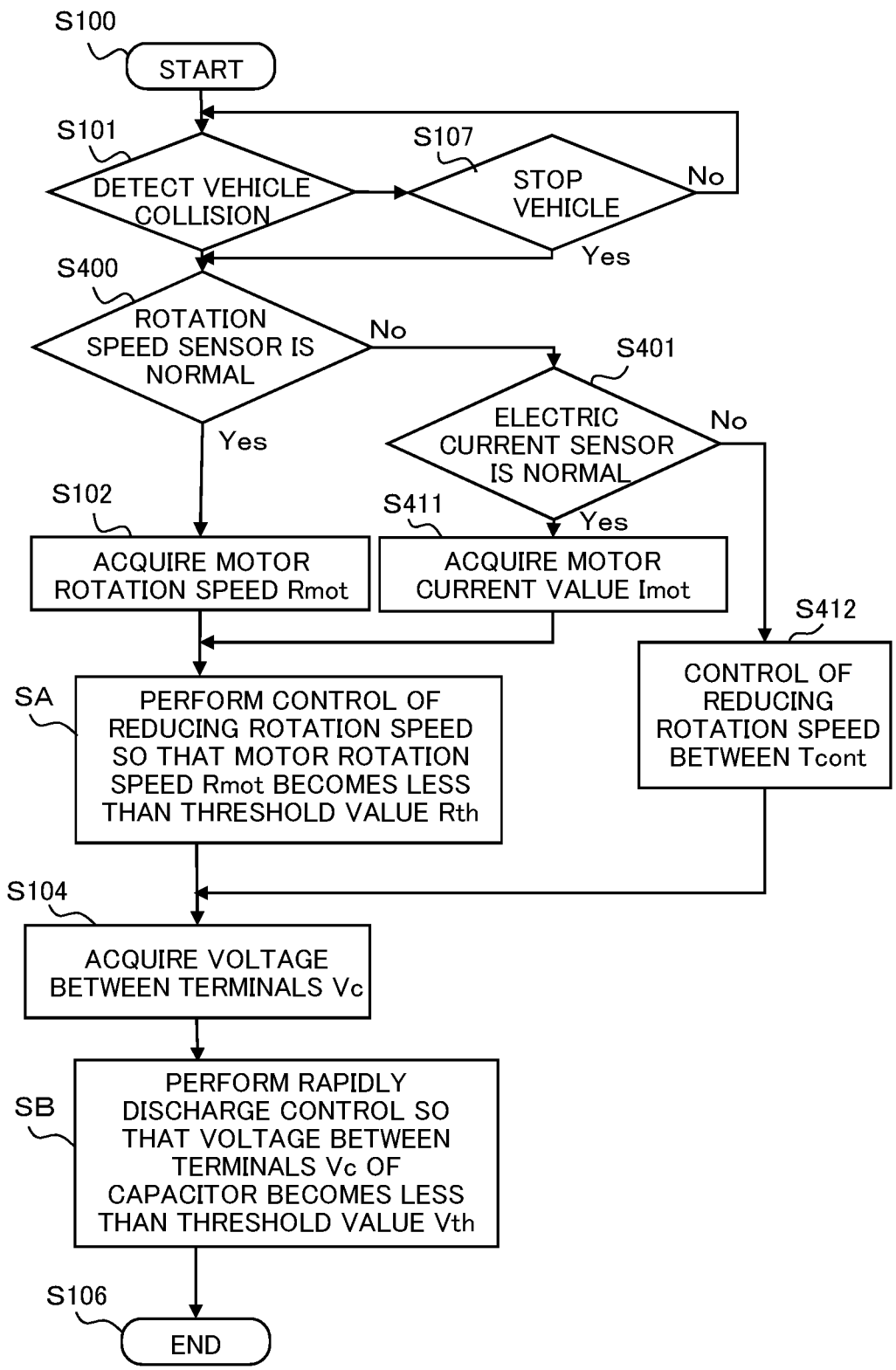
FIG. 4 is a flowchart showing control of reducing a rotation speed and rapid discharge control in the power conversion device according to the embodiment.

Next, the discharge operation of discharging electric charges in the secondary smoothing capacitor 50 by the inverter controller 72 will be explained with reference to a flowchart shown in FIG. 4.

First, after the start (Step S100), the discharge determination instruction section 73 acquires collision detection information of the vehicle from the discharge determination section 74 (for example, an accelerator sensor). When a vehicle collision is detected, the discharge determination instruction section 73 outputs an instruction of discharge to the inverter controller 72, and the process proceeds to Step S400. When a collision is not detected, the process proceeds to Step S107.

In Step S107, vehicle speed information is acquired from the vehicle speed controller 75, and the instruction of discharge is outputted to the inverter controller 72 when the stop of the vehicle is detected, then, the process proceeds to Step S400. When the stop of the vehicle is not detected, the process returns to Step S101.

In Step S400, whether the rotation speed sensor 61 of the motor is normal is checked. When the sensor is normal, the process proceeds to Step S102 and when the sensor is not normal, whether the electric current sensor 62 is normal is checked in Step S401. When the electric current sensor 62 is normal, a motor current value Imot is acquired in Step S411. When it is determined that it is difficult to detect an electric current value because the electric current sensor 62 is not normal in Step S401, control of reducing the rotation speed of the motor is performed for a certain period of time in Step S412. After that, rapid discharge control is performed to complete electric discharge.

In Step S102, information of a rotation speed Rmot is acquired by the rotation speed sensor 61, and the control of reducing the rotation speed is performed so that the motor rotation speed Rmot is less than a threshold value Rth which is previously set as shown in Step SA. When the rotation speed sensor 61 is not normal in Step S400, an electric current value detected by the electric current sensor 62 is used instead of using the rotation speed by the rotation speed sensor 61. That is, when the electric current value detected by the electric current sensor 62 exceeds the threshold value which is previously set, the control of reducing the rotation speed is continued by the inverter controller (inverter controller 72). After Step SA, a voltage between terminals Vc is acquired in Step S104, and the rapid discharge control is performed so that the voltage between terminals Vc of the capacitor becomes less than a threshold value Vth as shown in Step SB, then, the process ends in Step S106.

Figure 5:
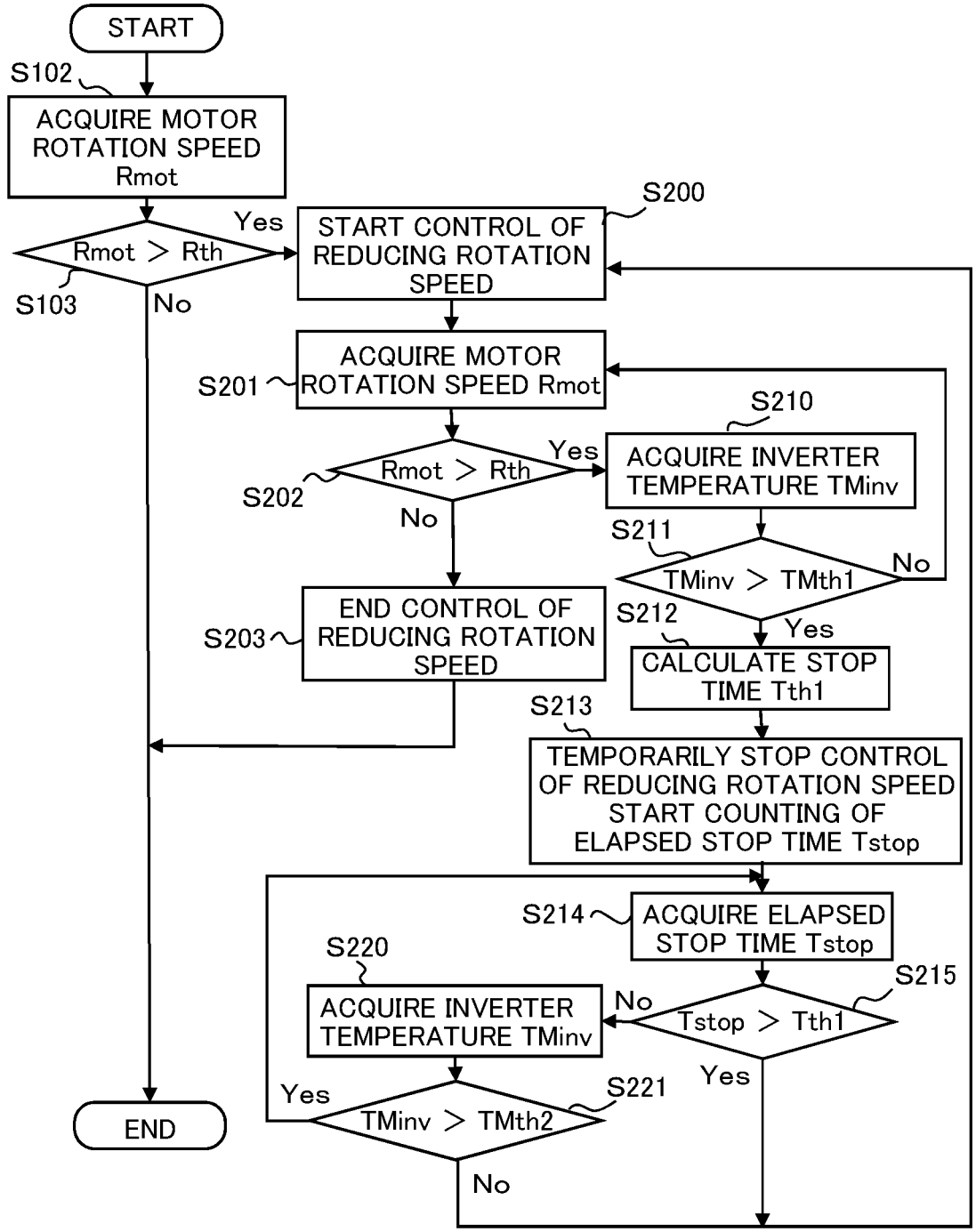
FIG. 5 is a flowchart showing the control of reducing the rotation speed in the power conversion device according to the embodiment.

The specific contents of Step SA are as shown in FIG. 5. That is, the rotation speed Rmot obtained in Step S102 is compared with the threshold value Rth which is previously set in Step S103. The given threshold value Rth is a setting value for determining whether it is necessary to reduce the rotation speed of the three-phase AC motor 60 or not. When it is determined that Rmot>Rth, the control of reducing the rotation speed of the motor is started as a rotation speed exceeds the given rotation speed, then, the process proceeds to Step S200. On the other hand, when Rmot>Rth is not determined, that is, when it is determined that the rotation speed is less than the given rotation speed, the process proceeds to Step S104. When the electric current value detected by the electric current sensor 62 is less than the threshold value which is previously set in a case where the rotation speed sensor 61 is not normal, the process proceeds to Step S104 in the same manner as in the case where the rotation speed is less than the given rotation speed, and discharge control is performed by the inverter controller (inverter controller 72).

In Step S200, the control of reducing the rotation speed of the motor is started. The control of reducing the rotation speed of the motor is discharge control performed for suppressing the rotation speed of the three-phase AC motor 60. For example, the control is performed under a condition where the entire upper-arm side power semiconductor device 44a is in an OFF-state and the entire lower-arm side power semiconductor device 44b is in an ON-state at the same time.

In Step S201, the rotation speed Rmot obtained when the control of reducing the rotation speed of the motor is performed is acquired from the rotation speed sensor 61, and the process proceeds to Step S202.

In Step S202, the rotation speed Rmot obtained in Step S201 is compared with the given threshold value Rth which is previously set. When it is determined that Rmot>Rth, the control of reducing the rotation speed of the motor is continued, and the process proceeds to Step S210. On the other hand, when Rmot>Rth is not determined, the process proceeds to Step S203 to end the control of reducing the rotation speed of the motor, then, the process proceeds to Step S104. The threshold values Rth used when making comparison in Step S103 and Step S202 may be the same setting value as well as different setting values.

In Step S210, temperature information TMinv of the inverter 40 is acquired from the temperature sensor 43b, and the process proceeds to Step S211.

In Step S211, the temperature information TMinv of the inverter 40 obtained in Step S210 is compared with a given threshold value TMth 1 (limit temperature of driving) which is previously set. When it is determined that TMinv>Tmth1, it is determined that the temperature of the lower-arm side power semiconductor device 44b may be increased and there is a possibility that the lower-arm side power semiconductor device 44b results in failure, and the process proceeds to Step S212, where the control of reducing the rotation speed of the motor is temporarily stopped. On the other hand, when TMinv>TMth1 is not determined, the temperature of the lower-arm side power semiconductor device 44b is appropriate and the control of reducing the rotation speed of the motor is continued, then, the process proceeds to Step S201.

In Step S212, a stop time Tth1 during which the control of reducing the rotation speed of the motor is temporarily stopped is calculated, and the process proceeds to Step S213. As a method of calculating the stop time, for example, the following formula can be used.

$$Tth1 = d1 \times TMinv \text{ (}d1 \text{ is an influence coefficient of parameters).}$$

In Step S213, the control of reducing the rotation speed of the motor is temporarily stopped and counting of an elapsed stop time is started. Accordingly, the entire lower-arm side power semiconductor device 44b is in the OFF state and the temperature in the lower-arm side power semiconductor device 44b is reduced.

In Step S214, an elapsed stop time Tstop is acquired and the process proceeds to Step S215.

In Step S215, the elapsed stop time Tstop obtained in Step S214 is compared with the stop time Tth1 calculated in Step S212. When it is determined that Tstop>Tth1, the control of reducing the rotation speed of the motor is started again, and the process proceeds to Step S200. On the other hand, when Tstop>Tth1 is not determined, the temporary stop of the control of reducing the rotation speed of the motor is continued and the process proceeds to Step S220.

In Step S220, temperature information TMinv of the inverter 40 is acquired from the temperature sensors 43a and 43b, and the process proceeds to Step S221.

In Step S221, the temperature information TMinv of the inverter 40 obtained in Step S220 is compared with a given threshold TMth2 (temperature in which driving is possible) which is previously set. When it is determined that TMinv>TMth2, it is determined that the temperature of the lower-arm side power semiconductor device 44b is not a suitable temperature for restarting the control of reducing the rotation speed of the motor and the process proceeds to Step S214, where the temporary stop of the control of reducing the rotation speed of the motor is continued. On the other hand, when TMinv>TMth2 is not determined, the temperature of the lower-arm side power semiconductor device 44b is determined to be suitable and the control of reducing the rotation speed of the motor is restarted, then, the process proceeds to Step S200. TMth1 and TMth2 have a relationship of TMth1>TMth2. The control of reducing the rotation speed of the motor is restarted when the temperature of the lower-arm side power semiconductor device 44b exceeds the TMth2 before the temporary stop time passes.

Figure 6:
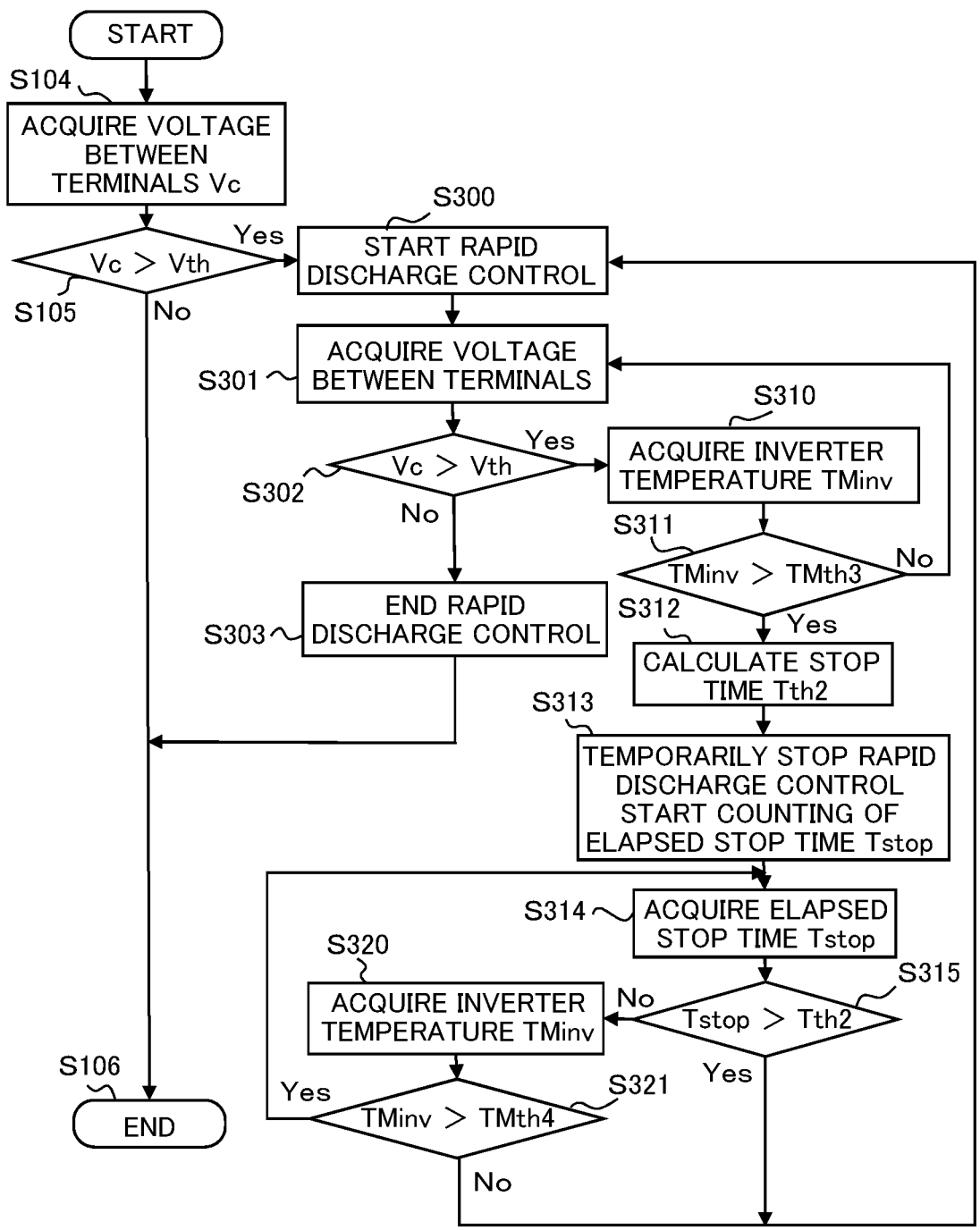
FIG. 6 is a flowchart showing the rapid discharge control in the power conversion device according to the embodiment.

The specific contents of Step SB are as shown in FIG. 6. That is, the voltage between terminals Vc of the secondary smoothing capacitor 50 is acquired by the voltage sensor 51 in Step S104, and the process proceeds to Step S105.

In Step S105, the voltage between terminals Vc obtained in Step S104 is compared with a given threshold value Vth which is previously set. Vth is a setting value for determining whether it is necessary to reduce the voltage between terminals of the secondary smoothing capacitor or not, and when it is determined that Vc>Vth, the rapid discharge control is started and the process proceeds to Step S300. On the other hand, Vc>Vth is not determined, the process proceeds to Step S106 to end the process.

In Step S300, rapid discharge control is started. The rapid discharge control is discharge control performed for rapidly discharging electric charges of the secondary smoothing capacitor. For example, the control is performed by switching between a state in which the entire upper-arm side power semiconductor device 44a is OFF and the entire lower-arm side power semiconductor device 44b is ON at the same time and a state in which the entire upper-arm side power semiconductor device 44a is ON and the entire lower-arm side power semiconductor device 44b is OFF at the same time.

In Step S301, the voltage between terminals Vc at the time of performing rapid discharge control is acquired from the voltage sensor 51 and the process proceeds to Step S302.

In Step S302, the voltage between terminals Vc obtained in Step S301 is compared with the given threshold Vth which is previously set. When it is determined that Vc>Vth, the rapid discharge control is continued, and the process proceeds to Step S310. On the other hand, when Vc>Vth is not determined, the process proceeds to Step S303 to end the rapid discharge control, then, the process proceeds to Step S106 to end the process.

The threshold values Vth used when making comparison in Step S105 and Step S302 may be the same setting value as well as different setting values.

In Step S310, temperature information TMinv of the inverter 40 is acquired by the temperature sensors 43a and 43b, and the process proceeds to Step S311.

In Step S311, the temperature information TMinv of the inverter 40 obtained in Step S310 is compared with a given threshold value TMth3 (limit temperature of driving) which is previously set. When TMinv>TMth3 is determined, it is determined that temperatures of the semiconductor switching devices 44a and 44b are increased and there is a possibility that the semiconductor switching devices 44a and 44b result in failure, and the process proceeds to Step S312 to temporarily stop the rapid discharge control. On the other hand, TMinv>TMth3 is not determined, the temperatures of the semiconductor switching devices 44a and 44b are determined to be suitable and the rapid discharge control is continued, then, the process proceeds to Step S301.

In Step S312, a stop time Tth2 during which the rapid discharge control is temporarily stopped is calculated, and the process proceeds to Step S313. As a method of calculating the stop time, for example, the following formula can be used.

$$Tth2 = d2 \times TMinv \text{ (}d2 \text{ is an influence coefficient of parameters).}$$

In Step S313, the rapid discharge control is temporarily stopped and counting of the elapsed stop time is started. Accordingly, switching of the semiconductor switching devices 44a and 44b are stopped and temperatures of the semiconductor switching devices 44a and 44b are decreased.

In Step S314, an elapsed stop time Tstop is acquired and the process proceeds to Step S315.

In Step S315, the elapsed stop time Tstop obtained in Step S314 is compared with the stop time Tth2 calculated in Step S312. When it is determined that Tstop>Tth2, the rapid discharge control is started again, and the process proceeds to Step S300. On the other hand, when Tstop>Tth2 is not determined, the temporary stop of the rapid discharge control is continued and the process proceeds to Step S320.

In Step S320, temperature information TMinv of the inverter 40 is acquired by the temperature sensors 43a and 43b, and the process proceeds to Step S321.

In Step S321, the temperature information TMinv of the inverter 40 obtained in Step S320 is compared with a given threshold value TMth4 (temperature in which driving is possible) which is previously set. When TMinv>TMth4 is determined, it is determined that temperatures of the semiconductor switching devices 44a and 44b are not suitable temperatures for restarting rapid discharge control, and the process proceeds to Step S314 to continue temporary stop of the rapid discharge control. On the other hand, when TMinv>TMth4 is not determined, it is determined that the temperature of the inverter is decreased to a temperature in which driving is possible and that the temperatures of the semiconductor switching devices 44a and 44b are suitable, therefore, the rapid discharge control is started again and the process proceeds to Step S300. TMth3 and TMth4 have a relationship of the TMth3>TMth4, and when the temperatures of the semiconductor switching devices 44a and 44b are less than TMth4 before the temporary stop time passes, it is determined that the temperature of the inverter is decreased to the temperature in which the driving is possible, therefore, rapid discharge control is started again.

The control of reducing the rotation speed of the three-phase AC motor 60 and the rapid discharge control of the secondary smoothing capacitor 50 are performed as described above, thereby controlling the three-phase AC motor 60 to be a sufficiently low rotation speed while avoiding a failure due to temperature increase of the inverter and rapidly performing discharge of the secondary smoothing capacitor 50.

In a case where the means for detecting the rotation speed of the motor is not normal and it is difficult to detect the rotation speed in Step S400, the control of reducing the rotation speed of the motor can be continued by using the electric current value in Step S401.

In this case, the electric value is used instead of the motor rotation speed as the threshold value for the control of reducing the rotation speed of the motor used after Step S103.

Also in Step S400 and Step S401, when neither the motor rotation sensor nor the electric current sensor is not normal and detection is not capable of being performed, the discharge operation can be performed by making a transition to Step S104 for starting rapid discharge control after the control of reducing the rotation speed of the motor is continued in Step S412 during a fixed period of time Tcont which is previously set.

Figure 7:
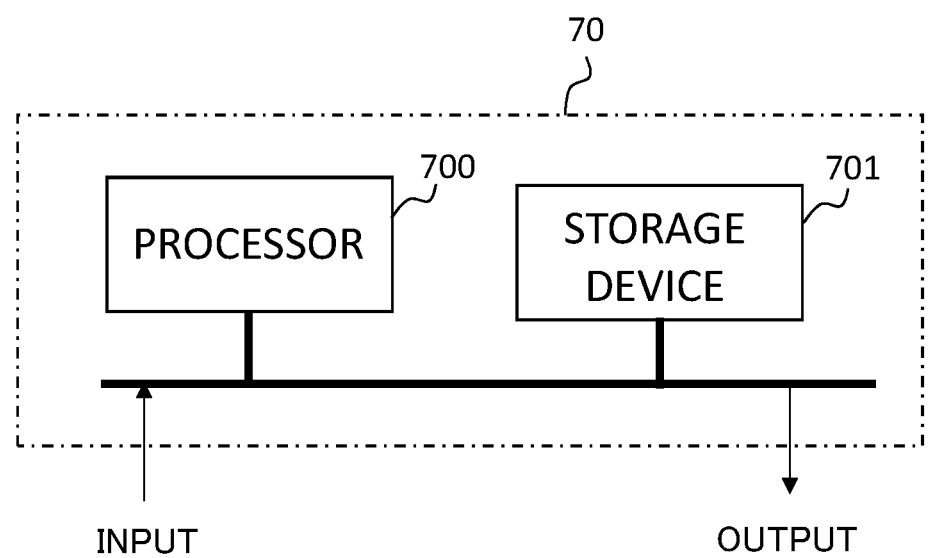
FIG. 7 is a diagram showing a configuration of a discharge control device used for the power conversion device.

The discharge controller 70 is configured by including a processor 700 and a storage device 701 as shown in FIG. 7 as an example of hardware. The storage device 701 includes a volatile storage device such as a random access memory and a non-volatile auxiliary storage device such as a flash memory, though not shown in detail. It is also preferable that an auxiliary storage device of a hard disk may be provided instead of the flash memory. The processor 700 executes a program inputted from the storage device 701. In this case, the program is inputted from the auxiliary storage device to the processor 700 through the volatile storage device. The processor 700 may also output data such as a calculation result to the volatile storage device of the storage device 701 as well as may store data in the auxiliary storage device through the volatile storage device.

Discharge control of the primary smoothing capacitor 30 and the energy transfer capacitor 23 may be performed by the converter controller 71 at the same time as the above-described discharge of the secondary smoothing capacitor 50.

In the preset invention, suitable combinations, suitable alterations and omission of arbitrary components in the embodiment may occur within a scope of the present invention.

What is claimed is:

1. A power conversion device connected between a power source and a motor, the power conversion device comprising:
    an inverter to convert a voltage outputted from the power source into an alternating current (AC) voltage;
    a temperature sensor to detect a temperature of the inverter;
    a capacitor to smooth a voltage between the power source and the inverter;
    a voltage sensor to detect a voltage of the capacitor;
    a rotation speed sensor to detect a rotation speed of the motor;
    an electric current sensor to detect electric current supplied to the motor; and a discharge control device to
- in response to the rotation speed of the motor being greater than a predetermined rotation speed threshold, start control of reducing the rotation speed of the motor in accordance with the temperature of the inverter, the rotation speed of the motor and the electric current supplied to the motor, and continue to perform the control of reducing the rotation speed of the motor until the rotation speed of the motor being less than or equal to the predetermined rotation speed threshold,
- during the control of reducing the rotation speed of the motor, acquire the temperature of the inverter when the rotation speed of the motor is greater than a predetermined rotation speed threshold, and determine whether the temperature of the inverter is greater than a predetermined temperature threshold;
- before ending the control of reducing the rotation speed of the motor, temporarily stop the control of reducing the rotation speed of the motor for a stop time period in response to the temperature of the inverter being greater than a predetermined temperature threshold, even when the rotation speed of the motor is greater than the predetermined rotation speed threshold; and
- after performing the control of reducing the rotation speed of the motor, perform discharge control of the capacitor to discharge electric charges accumulated in the capacitor.

2. The power conversion device according to claim 1, wherein the discharge control device is configured to set the stop time period to be proportional to the temperature of the inverter.

3. The power conversion device according to claim 2,
wherein the discharge control device comprises an inverter controller to control the inverter, and
wherein, in a case where a value of the electric current detected by the electric current sensor exceeds a predetermined threshold value when the rotation speed sensor is not normal, the control of reducing the rotation speed is performed by the inverter controller.

4. The power conversion device according to claim 1,
wherein, when the temperature of the inverter exceeds the predetermined temperature threshold during the discharge control, the discharge control device stops the discharge control, and
when the temperature of the inverter is less than the predetermined temperature threshold, the discharge control device resumes the discharge control.

5. The power conversion device according to claim 4,
wherein the discharge control device resumes the discharge control when an elapsed time since the stop of the discharge control is equal to a given period of time.

6. The power conversion device according to claim 4,
wherein the discharge control device comprises an inverter controller to control the inverter, and
wherein, in a case where a value of the electric current detected by the electric current sensor is less than a predetermined threshold value when the rotation speed sensor is not normal, the discharge control is performed by the inverter controller.

7. The power conversion device according to claim 1,
wherein the discharge control device resumes the control of reducing the rotation speed when the stop time period elapsed since the control of reducing the rotation speed is temporarily stopped, and
perform the discharge control when the rotation speed is decreased to be less than predetermined rotation speed threshold.

8. The power conversion device according to claim 1,
wherein the discharge control device set a transition between the control of reducing the rotation speed and the discharge control based on a value of the electric current detected by the electric current sensor.

9. The power conversion device according to claim 1,
wherein, in a case where the rotation speed sensor and the electric current sensor are not normal at a time of performing control of reducing the rotation speed, the discharge control is performed after the control of reducing the rotation speed is performed during a predetermined period of time.

\* \* \* \* \*